United States Patent [19]
Pitner

[11] 3,934,956
[45] Jan. 27, 1976

[54] AXIAL THRUST BEARING

[75] Inventor: Alfred Pitner, Paris, France

[73] Assignee: Nadella, France

[22] Filed: Mar. 19, 1974

[21] Appl. No.: 452,517

[30] Foreign Application Priority Data
Mar. 21, 1973   France .......................... 73.10070

[52] U.S. Cl. ................. 308/174; 308/212; 308/219; 308/227
[51] Int. Cl.² .......................................... F16C 19/34
[58] Field of Search .......... 308/174, 219, 235, 202, 308/212, 213, 214, 227

[56]   References Cited
UNITED STATES PATENTS

| 3,031,239 | 4/1962 | Pitner | 308/235 |
|---|---|---|---|
| 3,093,427 | 6/1963 | Vasta | 308/219 |
| 3,168,359 | 2/1965 | Murphy | 308/174 |
| 3,328,098 | 6/1967 | Budzich | 308/235 |
| 3,341,263 | 9/1967 | Pitner | 308/174 |
| 3,632,178 | 1/1972 | Pitner | 308/174 |
| 3,765,736 | 10/1973 | Pitner | 308/174 |

*Primary Examiner*—M. Henson Wood, Jr.
*Assistant Examiner*—Richard A. Bertsch
*Attorney, Agent, or Firm*—Robert E. Burns; Emmanuel J. Lobato; Bruce L. Adams

[57]   ABSTRACT

The thrust bearing comprises an annular support within which at least one annular plate is retained. The plate defines either a planar slideway if the bearing is a smooth bearing or a planar raceway if the bearing is a rolling bearing. At least one axially deformable annular elastically yieldable member is retained in the support and applied against the plate.

21 Claims, 9 Drawing Figures

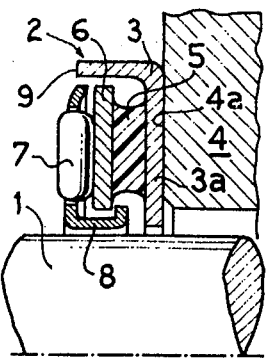
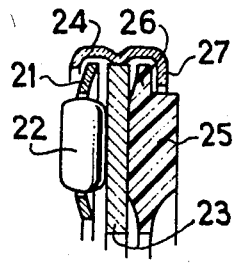
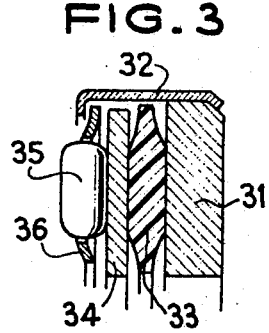
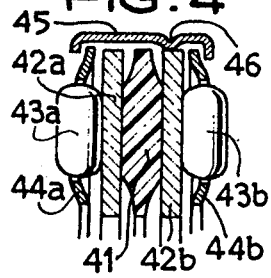
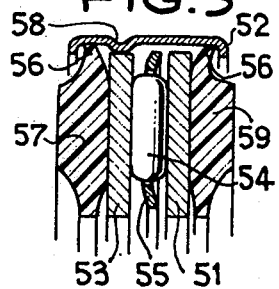
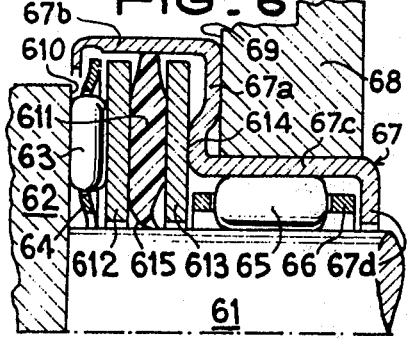
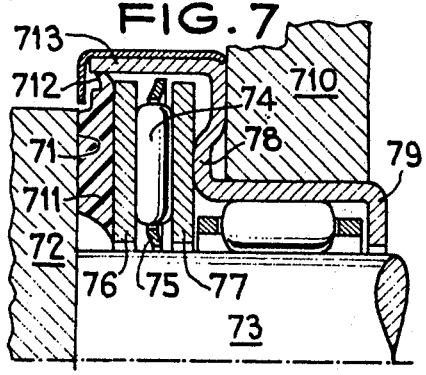
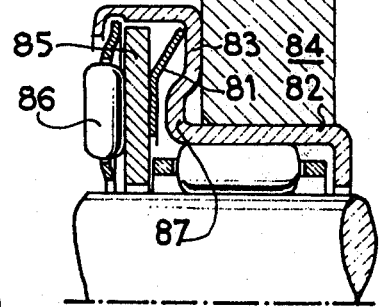
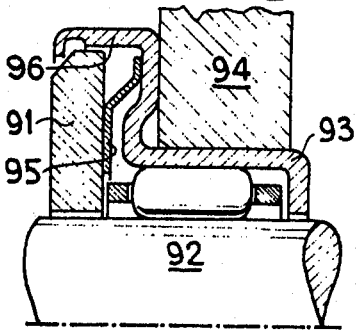

AXIAL THRUST BEARING

The present invention relates to axial thrust bearings comprising an annular support within which there is retained at least one annular plate having a planar surface which constitutes a raceway or slideway.

Such a thrust bearing is normally mounted around a shaft for transmitting an axial thrust exerted by a shoulder on the shaft to an axially fixed support means which surrounds the shaft, this support means and the shaft having a relative movement of rotation.

In known axial thrust bearings, the axial displacement of the shaft in the direction in which the thrust is exerted is limited by the invariable axial dimension of the thrust bearing under load. This limitation may have for drawback in certain applications the creation of unacceptable overloads due in particular to expansions which are liable to damage the bearing. Further, the use of a thrust bearing whose axial dimension, owing to the effect of manufacturing tolerances, might be less than the clearance normally provided between the radial surfaces of the shoulder and the support means may require the use of spacer members or shims. In this case, the aforementioned drawbacks may be once again met with.

An object of the present invention is to overcome these drawbacks and to provide an axial thrust bearing of the aforementioned type wherein at least one axially deformable annular elastically yieldable means, retained in the support, is applied against the plate or one of the plates. It is thus possible to mount such a thrust bearing by subjecting it to an axial pre-stressing achieved by an initial compression of the elastically yieldable means so that, upon assembly, differences, due to the tolerances, in the clearance between the radial surfaces between which the thrust bearing is positioned may be taken up and that, in operation, the overloads may be absorbed by an additional compression of the elastically yieldable means.

When the elastically yieldable means is a spring constituted by a steel washer of variable conicity, its deformation under load may be limited by a cooperative support region provided on the support.

The elastically yieldable means moreover permits accommodating lack of parallelism between the machined parts between which the axial or thrust bearing is disposed.

Many embodiments may be envisaged for the axial thrust bearing according to the invention.

In a typical embodiment, the annular support is a housing comprising a radial surface and an axis lateral wall which covers the inner elements of the thrust bearing, the elastically yieldable means being preferably constituted by a pad of elastomer disposed between the radial surface of the housing and the raceway or slideway plate.

In another typical embodiment, the annular support is a simple cylindrical sleeve whose ends include radial flanges for retaining the components of the thrust bearing which, in a particular case, include raceway plates surrounding a ring arrangement of thrust bearing needles and receiving in bearing relation thereto respectively one and the other of two elastomeric pads which remain uncovered in the bearing.

In a third typical embodiment, the thrust bearing is combined with a radial needle bearing. The support is then a housing including an axial lateral wall connected by a radial surface to a cylindrical portion which defines a rolling bearing ring for the needles of the radial rolling bearing. In this case, the radial part of the housing is advantageously in accordance with French Pat. No. 1,401,267, that is to say, it includes an annular boss located radially in the region of the centre part of the slideway plate or thrust bearing needles in contact with the raceway plate. Here again, the elastically yieldable means may be an elastomeric pad which remains uncovered in the bearing, it being applied for example on one of the raceway plates for the thrust bearing needles, the other raceway plate bearing against the annular boss of the housing. In the case where the elastically yieldable means is a metal washer, the deformation of the latter may be limited by its abutment with the annular boss.

Whatever be the form of the support, when the elastically yieldable means is a pad of elastomer which remains uncovered in the bearing, this pad may have a sealing function. For this purpose, it is provided with a flexible lip portion which slides along the cylindrical surface of the sleeve or of the axial lateral wall.

Further features and advantages of the invention will be apparent from the ensuing description with reference to the accompanying drawing.

In the drawing:

FIG. 1 is an axial sectional view of a thrust rolling bearing according to the invention employing an elastically yieldable annular pad protected by a housing;

FIG. 2 is a view of a modification of the bearing shown in FIG. 1 with an elastically yieldable annular pad maintained by a sleeve integral with the annular raceway plate;

FIG. 3 is a view of another modification of the bearing shown in FIG. 1;

FIG. 4 is a view of a rolling bearing constituting a double thrust rilling bearing and constructed in accordance with the teaching of the invention;

FIG. 5 is a view of a thrust rolling bearing with a retaining counter-plate;

FIG. 6 is a view of a combined radial and axial rolling bearing in which the axial or thrust bearing has as elastically yieldable means a pad of elastomer interposed between ring arrangements of the needles of the respective rolling bearings;

FIG. 7 is a view of a modification of the bearing shown in FIG. 6 in which the elastically yieldable pad is uncovered in the combined rolling bearing;

FIG. 8 is a view of a modification of the bearing shown in FIG. 6 in which an annular spring is substituted for the elastically yieldable pad, and FIG. 9 is a view of a modification of the bearing shown in FIG. 8, employing a thrust smooth bearing.

In the embodiment shown in FIG. 1, a shaft 1 extends through the centre opening of a thrust or axial rolling bearing 2 which bears by a planar surface 3a of its housing 3 against the planar surface 4a of an element 4 which is fixed with respect to the rotating shaft 1. Adjacent the housing 3, which is in contact with the element 4, there is bonded an elastically yieldable pad 5 to which is bonded an annular raceway plate 6 for rolling bearing needles 7 which are guided by a radial cage 8 centered and axially retained by the plate 6. The axial end portion 9 of the housing 2 protects the rolling bearing against the entry of undesirable substances and guides the plate 6 in the course of its axial displacement.

FIG. 2 represents a modification of the bearing shown in FIG. 1 in which the radial cage 21 which guides the needles 32 is maintained axially with respect to the annular raceway plate 23 by a sleeve 24 which moreover axially retains an elastically yieldable pad 25 which has a peripheral flange portion 26 which serves to centre and retain the pad by cooperation with the radial flange 27 of the sleeve 24.

With reference to FIG. 3, there is shown a thick annular plate 31 which is adapted to bear on a machine part and is provided with a sleeve 32 which retains an elastically yieldable pad 33, an annular raceway plate 34 and a ring arrangement of thrust bearing needles 35 which are guided by a radial cage 36 and roll along the plates 34.

In FIG. 4, which represents a double thrust rolling bearing, an elastically yieldable pad 41 is interposed between two annular plates 42a and 42b along which roll bearing needles 42a and 42b respectively, these needles being guided by radial cages 44a and 44b which are retained by a sleeve 45 held in position on one of the annular raceway plate, namely the plate 42b in the illustrated embodiment by the effect of a constriction 46. Such a construction has the advantage of employing two identical assemblies comprising a cage, needles and an annular raceway, which reduces to five the number of different elements incorporated in the double bearing.

FIG. 5 shows a thrust rolling bearing the component parts of which, retained by a sleeve 52, include a raceway plate 53 rendered integral with the sleeve by a constriction 58, a ring arrangement of thrust bearing needles 54 guided by a radial cage 55 and rolling along the plate 53 and a counter-plate 51, and two elastically yieldable pads 57, 59 which are disposed on opposite sides of the plates 53, 51 and are uncovered in the bearing. These two pads have at their periphery a radial lip portion 56 which engages the cylindrical inner surface of the sleeve 52 and thereby seal the cavity of the bearing occupied by the needles 54. As in the embodiment shown in FIG. 4, the elements inside the sleeve have a symmetrical arrangement.

In FIG. 6, the shaft 51 is provided with a shoulder 62 whose radial surface 610 constitute one of the raceways of a ring arrangement of thrust bearing needles 63 guided by a radial cage 64. Disposed around the shaft 51 is a ring arrangement of radial bearing needles 65 guided by an axial cage 66. The two bearings are enclosed in a housing 67 of pressed sheet metal which bears through a radial surface 67a (interconnecting the axial lateral wall 67b to the cylindrical portion 67c constituting a radial rolling bearing ring) against a surface 69 of a machine part 68, which surface 69 is roughly parallel to the surface 610 of the shoulder 62. A pre-stressing of the needles 63 is achieved by the compression of an annular elastically yieldable pad 611 between two annular plates 612 and 613, the plate 612 of which carries the other raceway for the needles 63 whereas the plate 613 bears against the annular boss 614 of the housing 67. The plate 613 axially retains in one direction the needles 65 which are retained in the other direction by the flange 67d of the housing 67. It will be observed that the annular pad 611 is in sliding contact with the shaft 61 through a lip portion 615 whereas its peripheral outer edge is in tight contact with the axial lateral wall 67b so that it is possible to employ different lubricants for the thrust bearing and the radial rolling bearing.

FIG. 7 shows a particularly advantageous modification of the embodiment shown in FIG. 6 in that it permits avoiding the grinding of the radial surface 71 of the shoulder 72 of the shaft 73. In this embodiment, of a combined rolling bearing, the thrust bearing needles 74 guided by a cage 75 are interposed between two annular raceway plates 76, 77, one of these plates bearing against annular boss 78 of the housing 79 which cooperates with the machine part 710, whereas the other plate 76 is in contact with an elastically yieldable pad 711 provided with a sealing lip portion 712 which is in sliding contact with the cylindrical lateral portion 713 of the housing 79. This pad 711 is driven in rotation by its contact with the surface 71 and drives the annular plate 76 to which it may be bonded if desired. Further, the pad 711 ensures an additional sealing between the radial surface 71 and the interior of the rolling bearing.

In FIG. 8, a metal washer 81 which includes a conical portion 81a, which may be continuous or discontinuous and is axially deformable, bears against the housing 82 in its radial portion 83 in contact with a machine part 84 and against the plate 85 carrying the raceway for the needles 86 of the axial rolling bearing in the region of the boss 87.

FIG. 9 represents a modification of the embodiment shown in FIG. 8 in which an axial or thrust smooth bearing 91 in the form of an annular plate is retained by the axial lateral wall 96 of the housing 93 which bears against a machine part 94. An elastically yieldable steel washer 95 having a Z-shaped axial section tends to urge the thrust plate 91 of the smooth bearing outwardly by bearing through its parallel branches, on one hand, against the housing 93 and, on the other hand, against the plate 91.

It will be understood that certain modifications may be made in the embodiment described hereinbefore. Thus, a positive mechanical connection may be provided by judiciously cutting out and/or shaping the elastically yieldable means and the plate or plates so as to avoid a bonding thereof. The elastically yieldable means may possibly be constituted by an axial washer of the Belleville or Borelli ring type.

Having now described my invention what I claim as new and desire to secure by Letters Patent is:

1. A thrust bearing comprising an annular support structure having means defining a radially inwardly extending retaining face at each end of the structure, at least one annular plate disposed within the support structure and defining a raceway, a ring arrangement of radial rolling elements in rolling contact with the raceway and a cage which guides the rolling elements, at least one axially deformable annular elastically yieldable means disposed within the support structure in freely axially movable relation to the support structure, and applied against in contact with the plate on a side of the plate remote from the rolling elements, one of said retaining faces axially retainingly cooperating with the cage and the other retaining face axially retaining the yieldable means, the rolling elements being uncovered for direct engagement with a machine part.

2. A bearing as claimed in claim 1, wherein the elastically yieldable means is constituted by an annular pad of generally planar shape.

3. A bearing as claimed in claim 2, wherein the pad is of elastomeric material.

4. A bearing as claimed in claim 1, wherein the elastically yieldable means is constituted by an annular metal spring.

5. A bearing as claimed in claim 1, wherein the support structure is an annular sleeve having at each end of the sleeve a radial flange defining one of said retaining faces.

6. A bearing as claimed in claim 1, wherein the elastically yieldable means is at least partially uncovered so as to be capable of coming in direct contact with a radial surface exterior to the bearing when the bearing is mounted.

7. A thrust bearing as claimed in claim 1, wherein the support structure comprises an annular sleeve having an inner radial flange defining one of said retaining faces, an annular member defining the other of said retaining faces and means for holding the sleeve and annular member axially assembled.

8. A thrust bearing as claimed in claim 1, further comprising a second annular plate and second axially deformable annular elastically yieldable means interposed between the cage and the corresponding retaining face of the support structure, the second plate defining a raceway in engagement with the rolling elements, the second yieldable means being in contact with the second annular plate and retained by said corresponding retaining face of the support structure, both yieldable means being exposed for direct axial engagement with machine parts outside the thrust bearing.

9. A thrust bearing comprising an annular housing including a radial surface and an axial lateral wall having a generally cylindrical shape, at least one annular plate in retained relation to the housing and having a smooth planar surface, for use as a raceway or slideway, at least one axially deformable annular elastically yieldable means constituted by an annular pad of generally planar shape in bonded relation to the radial surface of the housing and to a surface of the plate which is opposed to said smooth planar surface.

10. A combined thrust and journal bearing comprising an annular housing including a radial surface and an axial lateral wall having a generally cylindrical shape, at least one annular plate in retained relation to the housing and having a smooth planar surface, for use as a raceway or slideway, at least one axially deformable annular elastically yieldable means in retained relation to the housing and applied against the plate, the housing comprising a cylindrical portion which is concentric with the axial lateral wall and constitutes a rolling bearing ring and has a radial flange, there being provided a cylindrical ring arrangement of axially extending rolling elements which are in contact with the bearing ring and in axially retained relation, in one direction, to the radial flange and, in the other direction, to the annular plate.

11. A thrust bearing comprising an annular housing including a radial surface and an axial lateral wall having a generally cylindrical shape, two annular plates each defining a raceway and in coaxial and axially retained relation to the housing, a ring arrangement of radial rolling elements interposed between and in rolling contact with the raceways, a cage which is in retained relation to the housing and guides the rolling elements, and at least one axially deformable annular elastically yieldable means in retained relation to the housing, the elastically yieldable means being at least partially uncovered by the housing so as to be capable of coming in direct contact with a radial surface exterior to the bearing when the bearing is mounted, one of the plates bearing against the radial surface of the housing whereas the other of said plates is in contact with the elastically yieldable means.

12. A combined thrust and journal bearing comprising an annular housing including a radial surface and an axial lateral wall having a generally cylindrical shape, two annular plates each defining a raceway and in coaxial and axially retained relation to the housing, a ring arrangement of radial rolling elements interposed between and in rolling contact with the raceways, a cage which is in retained relation to the housing and guides the rolling elements, and axially deformable annular elastically yieldable means in retained relation to the housing, the housing comprising a cylindrical portion which is concentric with the axial lateral wall and constitutes a rolling bearing ring and has a radial flange, there being provided a cylindrical ring arrangement of axially extending rolling elements which are in contact with the bearing ring and in axially retained relation, in one direction, to the radial flange and, in the other direction, to the annular plate, the elastically yieldable means being at least partially uncovered so as to be capable of coming in direct contact with a radial surface exterior to the bearing when the latter is mounted, one of the plates bearing against the radial surface of the housing whereas the other of said plates is in contact with the elastically yieldable means.

13. A thrust bearing comprising an annular sleeve having at each end of the sleeve a radial flange for retaining component parts of the bearing, two annular plates each defining a raceway and in coaxial and axially retained relation to the sleeve, a ring arrangement of radial rolling elements for each raceway for rolling along the raceway and a cage for each raceway which cage is in retained relation to the sleeve and guides the corresponding rollers, and elastically yieldable axially deformable means interposed between and engaging the plates.

14. A thrust bearing comprising an annular support, two annular plates each defining a raceway in coaxial and axially retained relation to the support, a ring arrangement of radial rolling elements interposed between the raceways for rolling along the raceways, a cage which is in retained relation to the support and guides the rollers, the support being an annular sleeve having at each end of the sleeve a radial flange for retaining the component parts of the bearing, and elastically yieldable axially deformable means in contact with a side of each plate remote from the raceway and being uncovered by said flanges for directly contacting a member outside the bearing when the bearing is mounted.

15. A thrust bearing comprising an annular support, at least one annular plate in retained relation to the support and having a smooth planar surface for use as a raceway or slideway, at least one axially deformable annular elastically yieldable means in retained relation to the support and applied against the plate, the elastically yieldable means being constituted by an annular pad of generally planar shape, the support having an inner surface and the annular pad comprising a radial sealing lip portion which is in sliding contact with the inner surface.

16. A thrust bearing comprising an annular housing including a radial surface and an axial lateral wall having a generally cylindrical shape, at least one annular plate in retained relation to the housing and having a smooth planar surface, for use as a raceway or slideway, at least one axially deformable annular elastically yieldable means in retained relation to the housing and applied against the plate, the radial surface of the housing including an annular boss which is in axial alignment with a part of the annular plate and substantially mid-way between the outer and inner peripheries of the annular plate.

17. A thrust bearing comprising an annular housing including a radial surface and an axial lateral wall having a generally cylindrical shape, at least one annular plate in retained relation to the housing and having a smooth planar surface, for use as a raceway or slideway, at least one axially deformable annular elastically yieldable means constituted by an annular pad of generally planar shape which is in retained relation to the housing and applied against the plate and applied by an outer peripheral edge portion against the axial lateral wall of the housing, the pad including along an inner edge of the pad a radial sealing lip portion for cooperation with a rotary member.

18. A thrust bearing comprising an annular support, two annular plates which are within the support and have a smooth planar surface constituting a raceway, two ring arrangements of radial rolling elements each in contact with the corresponding raceway and a cage for guiding the rolling elements of each ring arrangement of rolling elements, means for holding one of the plates axially assembled with the support, an axially deformable annular elastically yieldable means interposed between and applied against the plates, and flanges at each end of the support for retainingly engaging the cages, the rolling elements being exposed for direct engagement with machine parts outside the bearing.

19. A combined thrust and journal bearing comprising an annular housing including a radial surface and an axial lateral wall having a generally cylindrical shape, an annular plate defining a raceway, a ring arrangement of radial rolling elements in rolling contact with the raceway, a cage guidingly cooperating with the rolling elements, annular axially deformable elastically yieldable means in contact with a side of the plate remote from the rolling elements and in contact with said radial surface, the housing defining an inner retaining means cooperative with the cage for axially retaining the cage, the rolling elements being exposed for direct axial engagement with a machine part outside the bearing, the housing comprising a cylindrical portion which is concentric with the axial lateral wall and constitutes a rolling bearing ring and has a radial flange, there being provided a cylindrical ring arrangement of axially extending rolling elements which are in contact with the bearing ring and in axially retained relation, in one direction, to the radial flange and, in the other direction, to the annular plate.

20. A combined thrust and journal bearing comprising an annular housing including a radial surface and an axial lateral wall having a generally cylindrical shape, an annular plate defining a raceway, a ring arrangement of radial rolling elements in rolling contact with the raceway, a cage guidingly cooperating with the rolling elements, annular axially deformable elastically yieldable means in contact with a side of the plate remote from the rolling elements, a second annular plate interposed between the yieldable means and said radial surface, the housing defining an inner retaining means cooperative with the cage for axially retaining the cage, the rolling elements being exposed for direct axial engagement with a machine part outside the bearing, the housing comprising a cylindrical portion which is concentric with the axial lateral wall and constitutes a rolling bearing ring and has a radial flange, there being provided a cylindrical ring arrangement of axially extending rolling elements which are in contact with the bearing ring and in axially retained relation, in one direction, to the radial flange and, in the other direction, to the second annular plate.

21. A combined thrust and journal bearing comprising an annular housing including a radial surface and an axial lateral wall having a generally cylindrical shape, an annular plate defining a smooth bearing surface for direct engagement with a machine part outside the bearing, an annular axially deformable elastically yieldable means having one side in contact with a side of the plate opposed to said smooth bearing surface and an opposed side in contact with said radial surface, the housing comprising a cylindrical portion which is concentric with the axial lateral wall and constitutes a rolling bearing ring and has a radial flange, there being provided a cylindrical ring arrangement of axially extending rolling elements which are in contact with the bearing ring and in axially retained relation, in one direction, to the radial flange and, in the other direction, to the annular plate.

* * * * *